Sept. 22, 1970  F. HOCK  3,529,894
INTERFEROMETER EMPLOYING A PLURALITY OF PAIRS
OF INTERFERING BEAMS
Filed Jan. 22, 1968

INVENTOR
Fromund Hock
BY
Krafft & Wells
ATTORNEYS

United States Patent Office 3,529,894
Patented Sept. 22, 1970

3,529,894
INTERFEROMETER EMPLOYING A PLURALITY OF PAIRS OF INTERFERING BEAMS
Fromund Hock, Wetzlar, Germany, assignor to Ernest Leitz G.m.b.H., Wetzlar, Germany
Filed Jan. 22, 1968, Ser. No. 699,650
Claims priority, application Germany, Jan. 25, 1967, L 55,585
Int. Cl. G01b 9/02
U.S. Cl. 356—113                     10 Claims

ABSTRACT OF THE DISCLOSURE

In an interferometer an illuminant light beam is produced wherein are comprised amplitudes in the two principal directions of vibration of the interferometer. A beam splitter is disposed in the path of said light beam for splitting the latter in two coherent component beams containing light energy in the two principal modes of vibration. Optical elements are provided for guiding said component beams along different optical paths of which at least one is anisotropic in relation tò the directions of vibrations of the light, thereby causing a phase shift between the principal directions of light vibration according to the path difference. The component beams are then re-combined and induced to interfere independently in the principal directions of the vibration of the light, thus generating superimposed phase shifted interference phenomena. From the re-combined beam two partial beams are taken away, one from each side of the beam combiner. Each partial beam is then directed to a beam splitter adapted to separate the partial beam into two linear polarized beams according to the principal directions of vibration of the interferometer. The resulting four linear polarized interfering light beams are incident on two pairs of photoelectric receivers from which signal pairs can be obtained that are counter-phased relative to each other. Further, the two signals of each pair on corresponding sides of the beam combiner are out of phase by 90° due to the law of conservation of energy, thereby introducing a proper phase shift of the anisotropic interferometer components.

CROSS-REFERENCE TO RELATED APPLICATIONS

Applicant claims priority under 35 U.S.C. 119 for application No. L 55, 585 IXa/42h, filed Jan. 25, 1967 in the Patent Office of the Federal Republic of Germany.

BACKGROUND OF THE INVENTION

Field of the invention

The present invention relates to interferometers, and in particular to interferometers using a plurality of interfering beam pairs.

Description of the prior art

To those skilled in the art interferometers are already known wherein in the path of one or both of the component beams, after separation by a beam splitter, means are disposed adapted to produce two wave fronts in each component beam by causing path differences in two directions of vibration that are normal relative to each other. After re-combination of said component beams by suitable optical means each portion of each component beam interferes wtih the correspondingly polarized portion of the other component beam. Thus, two phases shifted signals will be obtained which may be evaluated.

It is a disadvantage, however, that these signals have to be described by a pure alternating component superimposed on an average constant signal level. Changes in the light flux through the interferometer disturb this constant signal level, thereby likewise disturbing the accuracy of the positive measurement.

SUMMARY OF THE INVENTION

It is the object of the present invention to provide a novel interferometer by which these disturbing level shifts of the constant signal are eliminated. The idea underlying the invention is that these D.C. signal parts may be suppressed by producing pairs of push-pull signals and rejecting the common mode parts of the signals including the unwanted D.C. parts by a long tail push-pull amplifier. The output signals obtained will be pure A.C. signals. The signal portions caused by the average D.C. portion of the signals will be suppressed.

This object of the invention is attained by providing a light source and a beam splitter adapted to split the illuminant light beam in two coherent component beams. Further, optical elements are arranged adapted to guide each one of the component beams along a different optical path, which paths, however, are anisotropic in relation to the principal directions of vibration of the light. Said elements also being adapted to re-combine said component beams after their travel along said paths—allowing said component beams to interfere—and to separate said re-combined beams into two partial beams, one on each side of the beam combiner. An additional beam splitter is disposed in the path of each partial beam, by which each of said beams is separated into two linear polarized beams corresponding to the two principal directions of light vibration in the interferometer. One photoelectric receiver is allocated to each new beam. The output signals of said receivers for each direction of vibration on both sides of the beam combiner are supplied to two push-pull amplifier having suitable common mode rejection that are pure A.C. signals.

Two prisms cemented together and thereby providing a beam splitter may be used as part of the above mentioned optical elements. However, in another embodiment these prisms may be replaced by an optical resonator. As a light source preferably a laser is used.

DESCRIPTION OF THE DRAWINGS

The above and other aspects and details of the invention will be more readily comprehended from three embodiments described by way of example hereinafter when taken in conjunction with the appending drawings wherein.

Figure 1:
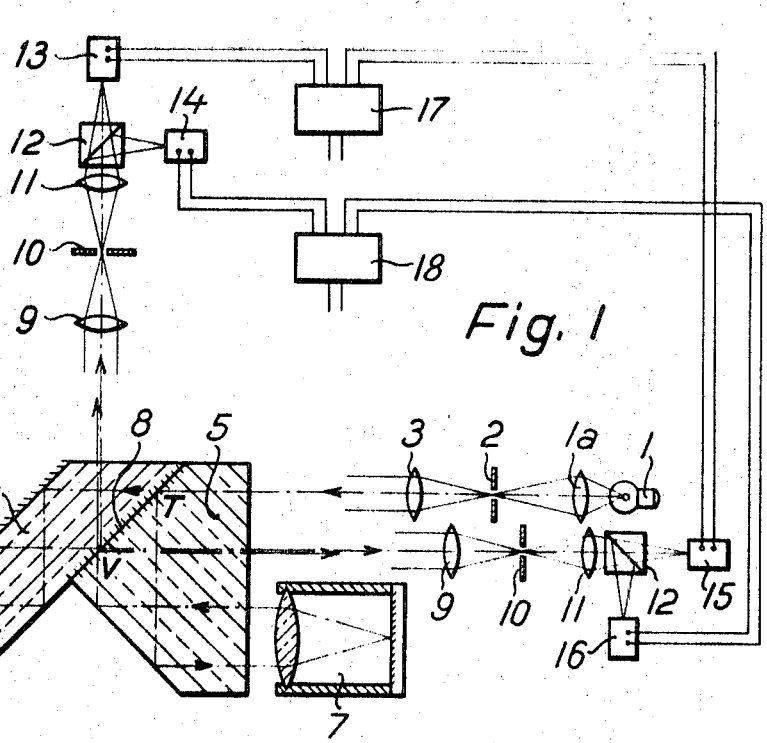
FIG. 1 shows diagrammatically the arrangement of an interferometer apparatus in accordance with the invention wherein two cemented prisms with a beam splitting surface between them are used as the optical beam splitting and re-combining element.

Referring first to FIG. 1 of the drawings there is shown a spiltting prism positioned between two tilt-insensitive mirror arrangements 6 and 7 which face each other. As indicated by arrows, the mirror arrangement 6 is arranged to move with an object. The splitting prism consists of two cemented prisms, 4 and 5, which are provided with a non-polarizing semi-transparent coating 8 at their cemented face. The prisms are so shaped that in prism 5 only one total internal reflection takes place, but two total reflections take place within the prism 4. As can be seen, in the arrangement shown, the splitting point T does not coincide with the combining point V. The pencils of rays leaving the splitting prism after combination are focused by the lenses 9 on the pinholes 10. Each pinhole is followed by a lens 11 and a polarizing splitter 12, the latter being associated with pairs of photoelectric receivers 13, 14 and 15, 16. The signals of the reecivers 13 and 14 and those of the receivers 15 and 16 have a 90° phase displacement in relation to each other, if the index of refraction of the total reflecting prisms has the proper value or if the phase shift between the two principal directions of vibration of the light is controlled by dielectric thin layers to a proper amount. Additionally the signals of one of the pairs, 15, 16, of the receivers are in counter-phase to the signals of the other pair 13, 14 of receivers, following the law of the conservation of energy. The signals of the pair of receivers 13 and 15 are supplied to an amplifier 17 and the signals of the pair of receivers 14, 16 are supplied to an amplifier 18, both amplifiers having suitable common mode rejection. The source of illumination consists of the lamp 1, with the condenser 1a, followed by a pinhole 2 and a collimating lens 3.

The light source produces natural or polarized light. It is also possible to use a laser as a source of polarized light. The direction of vibration being preferably at an angle of 45° to the principal axis of vibration of the set of prisms.

Figure 2:
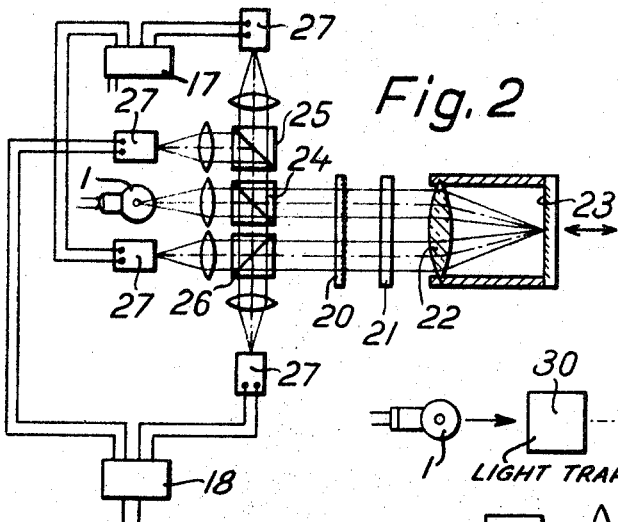
FIG. 2 shows diagrammatically a different form of an interferometer apparatus in accordance with the invention, wherein an optical resonator is used.

In the example shown in FIG. 2, the illuminating light enters an optical resonator, consisting in its essentials of a semi-transparent mirror 20, a double-refracting plate 21, introducing an optical path difference between the perpendicular vibrating components of the oscillating light flux, a lens 22 and a reflecting surface 23. The lens 22 and mirror 23 are rigidly connected together. This unit or a similar acting trihedrical prism (corner cube prism) can be moved along the optical axis, and its action is unaffected by tilting. The pencils of rays leaving the resonator are led, directly or by way of a splitter 24 to two polarizing splitters 25 and 26, which are associated with four photoelectric receivers 27 for the signals, these signals being 90° out of phase with each other, if the phase shift caused by the double refracting plate 21 is 90°. Periodicity of the signals occurs with displacement of the system 22, 23 by $\lambda/2$.

Figure 3:
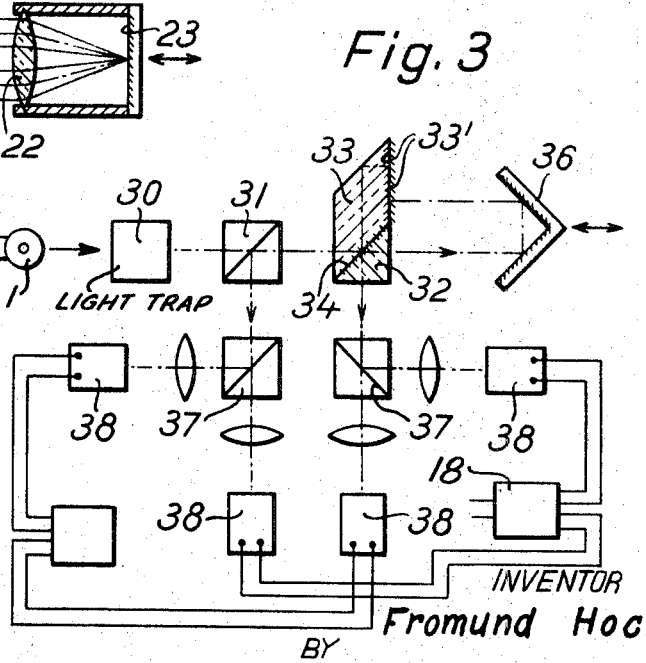
FIG. 3 shows diagrammatically a still further form of an interferometer apparatus in accordance with the invention also making use of two cemented prisms and additionally of a light trap.

In the arrangement shown in FIG. 3, the light enters through a light trap 30 which has no effect on the pencil of rays entering. The illuminant rays pass through a splitter 31 and enter a splitting prism. This is composed of two prisms 32 and 33 cemented together, the cemented face 34 being semi-transparent. The prism 33 is silvered on both sides of the face 33'. The illuminant light is split at the face 34. One component pencil of rays is totally reflected inside the prism 33, thereby undergoing a phase shift between the components of polarization and then impinges on the face 33'. The other component beam which passes through the face 34 emerges from the prism and is reflected by a central mirror 36 to the external side of the mirror face 33'. Mirror 36 is unaffected by tilting and is assigned to the object to be measured together with which it can be moved along the axis of the entering pencil of rays. The pencils of rays reflected by the mirror surfaces 33' interfere with each other after combination by the beam splitter 34. After the interfering pencils of rays have been combined and one part reflected by the splitting face 34, the pairs of interfering beams are led either directly or by way of the splitter 31 to two polarizing splitters 37, each of which is associated with two photoelectric receivers 38. By moving the mirror 36 four periodic, sinusoidal and by 90° phase displaced signals will be obtained having a periodicity of $\lambda/4$ of the mirror displacement. The signals can be supplied to two push-pull amplifiers.

Instead of the simultaneous production of signals with four receivers, such production is naturally also possible by successive scanning, a smaller number of photoelectric receivers being impinged upon. In the extreme case, one single receiver will suffice.

It is also possible to modulate the light from the source of illumination in the direction of polarization, the polarizing splitters and half the photoelectric receivers used then becoming superfluous.

It will be appreciated that, where desired, a dimming component may be used between a laser light source and the interferometer in order to avoid the influence resulting from possible phase variations on the stability of the laser emission.

What I claim is:

1. An interferometer apparatus comprising in combination;
    a light source producing a coherent beam;
    semi-transparent beam splitting means separating said beam into two coherent component beams;
    optical means guiding said coherent component beams along different optical paths of which at least one is anisotropic in relation to the direction of light vibrations, and of which at least one path is of variable length, said beam splitting means also recombining said component beams, thereby producing two pairs of interfering beams;
    polarizing beam splitting means in the path of each of said pairs of beams, said means separating said pairs of beams into two new partial beams each, according to their direction of polarization;
    photoelectric receivers in the path of each new partial beam, and amplifying means having common mode rejection to which the output signals of said photoelectric receivers are supplied in push-pull pairs.

2. An interferometer apparatus according to claim 1, wherein said optical means for separating the illuminant beam and for recombining the resultant component beams comprises two prisms (4, 5) cemented together, thereby providing a semitransparent surface (8).

3. An interferometer apparatus according to claim 1, wherein said optical means for guiding said coherent beams along different optical paths comprises the combination (6, 7) of a collective lens and a mirror in fixed relationship to each other in the path of each beam, one of said lens/mirror combinations (6) being displaceable in the direction of the optical axis.

4. An interferometer apparatus according to claim 1, wherein said light source (1) is a laser device.

5. An interferometer apparatus comprising in combination;
    a light source producing a beam;
    a beam splitter separating said beam into a first component beam and a second component beam;
    optical means reflecting said first component beam to said beam splitter and simultaneously guiding said first component beam anisotropically along an optical path of varying length, reflecting said anisotropically guided beam to said beam splitter and simultaneously guiding said anisotropically guided beam to a given point;
    a first polarizing beam splitter receiving a pair of beams comprising said second component beam and said anisotropically guided beam at said given point, a second polarizing beam splitter receiving a pair of beams comprising said reflected first component beam and said reflected anisotropically guided beam from said beam splitter, said polarizing beam splitters separating each pair of beams into two new beams according to their direction of polarization;
    photoelectric receivers in the path of each new beam; and
    differential amplifying means having a common mode rejection to which the output signals of said photoelectric receivers are supplied.

6. An interferometer apparatus according to claim 5, wherein said optical means comprise in the following order in the direction of light the combination of a semi-transparent mirror (20), a double-refracting plate (21) and a movable, tilt-insensitive central symmetric reflector.

7. An interferometer apparatus according to claim 5, wherein said light source (14) is a laser device.

8. An interferometer apparatus comprising in combination;
a light source producing an illuminant light beam;
a beam splitter separating said illuminant light beam into two coherent component beams;
optical means guiding said component beams along different optical paths of which at least one is anisotropic in relation to the direction of vibration of the light and at least one path is of variable optical thickness, said optical means also recombining said component beams after returning from their different paths and producing two pairs of interfering beams;
a beam splitter in the path of said illuminant beam, said beam splitter reflecting the recombined interfering beams toward the photoelectric receivers;
a polarizing beam splitter disposed in the path of each beam pair, said beam splitter separating said beam pair into two partial beams according to their directions of polarization and in accordance with the principal directions of the anisotropy;
a photoelectric receiver in the path of each partial beam; and
amplifying means having common mode rejection to which the output signals of said photoelectric receivers are supplied in push-pull pairs.

9. An interferometer apparatus according to claim 8, wherein said beam splitter is composed of two prisms cemented together.

10. An interferometer apparatus according to claim 8, wherein said optical means comprise said cemented prisms and a central mirror, said mirror being displaceable in the direction of the incident component beams.

References Cited

UNITED STATES PATENTS

| | | |
|---|---|---|
| 3,182,292 | 5/1965 | Schmid. |
| 3,225,644 | 12/1965 | Schuch. |
| 3,409,375 | 11/1968 | Hubbard _____ 356—106 |
| 3,434,787 | 3/1969 | Chitayat _____ 356—106 |

OTHER REFERENCES

German application 1,085,350, July 1960, Hock.

RONALD L. WIBERT, Primary Examiner

T. MAJOR, Assistant Examiner